United States Patent
Yatsu

Patent Number: 5,754,358
Date of Patent: May 19, 1998

[54] HEAD POSITIONING SYSTEM AND METHOD FOR USE IN DISK RECORDING/REPRODUCING APPARATUS

[75] Inventor: Masahide Yatsu, Tokyo, Japan

[73] Assignee: Kabushiki Kaisha Toshiba, Kanagawa-ken, Japan

[21] Appl. No.: 698,515

[22] Filed: Aug. 15, 1996

[30] Foreign Application Priority Data

Sep. 7, 1995 [JP] Japan ................... 7-230322

[51] Int. Cl.⁶ ....................... G11B 5/55
[52] U.S. Cl. ................ 360/78.09; 360/78.04
[58] Field of Search ............. 360/78.09, 78.04, 360/78.06, 78.07, 78.14; 369/44.28

[56] References Cited

U.S. PATENT DOCUMENTS

| | | | |
|---|---|---|---|
| 4,133,011 | 1/1979 | Kurzweil, Jr. | 360/78.09 |
| 5,151,639 | 9/1992 | Hasegawa et al. | 360/78.09 X |
| 5,371,449 | 12/1994 | Tajima et al. | 360/78.09 X |
| 5,381,282 | 1/1995 | Arai et al. | 360/78.09 |
| 5,469,414 | 11/1995 | Okamura | 360/78.09 X |
| 5,602,689 | 2/1997 | Kadlec et al. | 360/78.09 X |

*Primary Examiner*—Aristotelis M. Psitos
*Assistant Examiner*—James L. Habermehl
*Attorney, Agent, or Firm*—Limbach & Limbach LLP

[57] ABSTRACT

The present invention relates to a head positioning control system for controlling to move a head to a target position on a disk as a recording medium on the basis of servo data recorded on the disk in a disk drive. A speed control section calculates a model acceleration for the head on the basis of the distance between the target position and a model position. A model section models movement control for moving the head to the target position, on the basis of the model acceleration. The model position is updated by calculation in the model section. A correcting value for correcting the model acceleration is calculated on the basis of a displacement of the actual position of the head from the calculated model position. An actual machine section performs movement control for moving the head to the target position on the basis of the sum of the model acceleration and the correcting value. The actual position is updated by calculation in the actual machine section.

20 Claims, 9 Drawing Sheets

HEAD POSITIONING SYSTEM AND METHOD FOR USE IN DISK RECORDING/REPRODUCING APPARATUS

BACKGROUND OF THE INVENTION

1. Field of the Invention

The present invention relates to a head positioning system and method to be employed in a disk recording/reproducing apparatus such as a hard disk drive for performing speed control at the time of moving a head to a target position on a disk.

2. Description of the Related Art

A disk recording/reproducing apparatus such as a hard disk drive (HDD) uses a disk as a recording medium. Data is recorded into or reproduced from the disk by means of a head (in the case of the HDD, a magnetic head is used).

The disk recording/reproducing apparatus is equipped with a head positioning system for positioning the head in a target position (i.e. a position to be accessed) on the disk. In the case of a sector-type disk, the target position corresponds to a track (or a cylinder) including a target sector.

The head positioning system employed in the HDD will be described.

An HDD system of a particular small size employs a control system called "a sector servo system". In this system, the head is moved to a target position (specifically, the center of a track) and situated therein, using servo data prestored on the disk.

A head driving mechanism employed in the system includes a rotary head actuator and a voice coil motor (VCM) for driving the actuator. The head is held on a tip portion of the head actuator, and radially moved over the disk together with the actuator.

A micro controller (CPU) as a main component of the system calculates the amount of control for controlling the driving current of the VCM to thereby control the head to move to the target position.

A plurality of servo areas are provided at regular intervals in each track on the disk. A data sector for recording user data is provided between each pair of the adjacent servo areas. Each servo area stores the aforementioned servo data.

The servo data mainly consists of a cylinder code (or a track address) and burst data (position error information). The cylinder code is used for speed control which will be explained later, and for detecting a track on which the head is situated at present. The burst data is used for position control to position the head at the center of a target track, and for detecting a position error of the head relative to the center.

The normal control system mainly includes a speed control system, a transient control system, and a position control system. The speed control is also called "seek control", and executed to move the head from the present position to the target track.

After the speed control is executed to move the head to a position near the target track (e.g. a position apart from the target track by several tracks or less), it is switched to the transient control so as to make the head to further approach the target track. The position control is used to fix the head at the center of the target track as described above.

Figure 1:
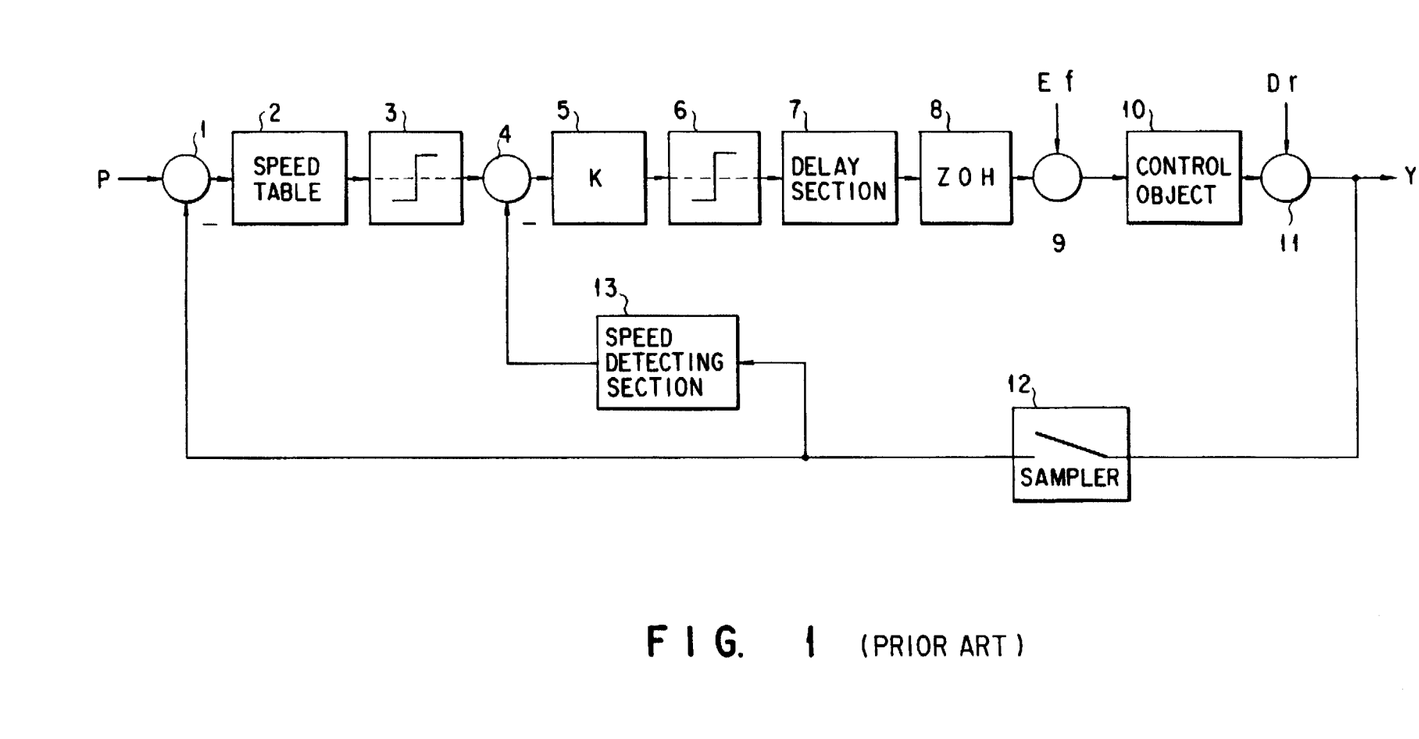
FIG. 1 is a block diagram, useful in explaining the conventional speed control system.

The speed control system is a feedback control system as shown in FIG. 1, and has a difference element 1 for calculating the difference between the target position P and the present position Y of the head (i.e. the number of tracks existing therebetween), and a speed table 2 for determining a target speed curve on the basis of the difference. The speed table 2 stores speed information for determining a target speed curve corresponding to the travel distance of the head (i.e. the difference between the positions Y and P). The target speed curve indicates speed modes during deceleration on a continuous basis.

Since in the actual system, the movement speed of the head has its upper (or lower) limit, the calculated target speed is limited by a limiter 3. The system also includes a difference element 4 for calculating the difference between the target speed curve and the actual speed of the head obtained by a speed detection unit 13.

In the HDD, the actual speed of the head cannot directly be measured. The speed detection unit 13 detects the present position (or the track address) Y of the head at regular intervals, using a sampler 12, and estimates the actual speed of the head from the travel distance and the time required.

The amount of control (the driving current) is obtained by multiplying the difference between the target speed and the actual speed by a gain K, using a compensating element 5. Thus, the travel speed of the head is adjusted by the compensating element 5 so that it can follow up the target speed curve.

A signal indicative of a control amount is supplied to the VCM for driving the head (i.e. a control object 10), via a limiter 6, a delaying element 7 and a zero-order hold (sample hold) element 8. The amount of control is calculated by the sampler 12 at regular sampling intervals so as to move the head of the object 10 to the target position.

The actual object 10 receives, for example, a disturbance force Ef due to the elastic force of a flexible cable (FPC) attached to the head actuator, or a force due to variations in operational characteristics of the HDD mechanism (e.g. the rotational vibration Dr of the disk). Accordingly, the calculated control amount is unstable. The disturbance force Ef or the force due to variations in the rotational vibration Dr, which are exerted upon the control object 10, are added to the aforementioned control amount by adder elements 9 and 11.

Therefore, while the control is shifted from the speed control to the transient control, the speed and/or position of the head may well vary, thereby creating an overshooting or an undershooting state wherein the head is greatly displaced from the target position during transient control. This being so, it is very difficult to accurately move the head to the target position, in particular, in the case of a recently developed disk which has a high track density.

In summary, the above-described conventional system has the following problems:

In the conventional system, it is highly possible that the travel speed or the position of the head, which should follow up the target speed curve, will vary because of head-position-varying factors such as ambient disturbance exerted upon the control object, the operational characteristics of the mechanism (e.g. the rotational vibration of the disk), etc. In addition, the actual speed of the head cannot be measured, and the difference between an estimated actual speed of the head and the target speed is calculated. Thus, the difference therebetween theoretically contains a factor of error. Accordingly, when the speed control has been shifted to the transient control, the factor of error having occurred during speed control cannot be compensated, with the result that an overshooting or undershooting state wherein the head is greatly displaced from the target position may well occur.

SUMMARY OF THE INVENTION

It is an object of the present invention to provide a head positioning system with a speed control system which operates on a principle different from that of the conventional control system and can compensate head-position-varying factors such as ambient disturbance, the operation characteristics of the mechanism, etc., thereby situating a head in a target position in a stable and accurate manner.

According to a first aspect of the present invention, there is provided a head positioning control system for controlling to move a head to a target position on a disk as a recording medium on the basis of servo data recorded on the disk in a disk drive, the system comprising model control means for modeling movement control for moving the head to the target position, thereby calculating a model position of the head; actual control means for performing movement control for moving the head to the target position, thereby calculating the actual position of the head; means for calculating a model acceleration for the head on the basis of the distance between the target position and the model position, the model acceleration being used in the model control means and the actual control means; and means for calculating a correcting value for correcting the model acceleration, on the basis of a displacement of the actual position from the model position, the correcting value being added to the model acceleration used in the actual control means.

According to a second aspect of the present invention, there is provided a head positioning control system for controlling to move a head to a target position on a disk as a recording medium on the basis of servo data recorded on the disk in a disk drive, the system comprising model control means for modeling movement control for moving the head to the target position, thereby calculating a model position of the head; actual control means for performing movement control for moving the head to the target position, thereby calculating the actual position of the head; means for calculating a model acceleration for the head on the basis of one of the distance between the target position and the actual position, and the distance between the target position and the model position, the model acceleration being used in the model control means and the actual control means; means for calculating a correcting value for correcting the model acceleration, on the basis of a displacement of the actual position from the model position, the correcting value being added to one of the model acceleration used in the model control means, and the model acceleration used in the actual control means; and switch means, wherein when the head is in an acceleration zone, the switch means causes the actual position calculated by the actual control means to be supplied to the model acceleration calculating means, and causes the correcting value calculated by the correcting value calculation means to be supplied to the model control means, and when the head is in a deceleration zone, the switch means causes the model position calculated by the model control means to be supplied to the model acceleration calculating means, and causes the correcting value calculated by the correcting value calculation means to be supplied to the actual control means.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

First, the outline of each of the embodiments (first and second embodiments) of the present invention will be described briefly in order to facilitate the understanding thereof. Thereafter, they will be described in detail.

A system according to the first embodiment, which will be described in detail later, is a head positioning control system comprising a model speed control system and an actual speed control system for controlling the travel speed of a head so as to move the head to a target position.

The model speed control system calculates model acceleration on the basis of the model position of the head and the target position, and repeats the calculation until the model position becomes identical to the target position. The model position is accurately controlled by the model speed control system such that it follows up the target position.

On the other hand, the actual speed control system calculates the difference between the actual head position and the model position, and moves the head on the basis of the amount of control obtained with reference to the model acceleration. Further, this system calculates an acceleration correcting value on the basis of the difference between the actual head position and the model position, thereby correcting the model acceleration output from the model speed control system and adjusting the travel speed of the head.

The model speed control system accurately calculates model acceleration corresponding to the distance to the target position, irrespective of variation factors such as ambient disturbance, the operational characteristics of the HDD mechanism, etc. In other words, this system can obtain a speed curve which makes the head travel speed accurately follow up a target speed curve based on the travel distance of the head.

On the other hand, the actual speed control system calculates the amount of control based on the model acceleration, and actually moves the head. At this time, the amount of control or the position of the head is in an unstable state because of variation factors such as ambient disturbance, the operation characteristics of the HDD mechanism, etc. The actual speed control system calculates the difference between the varied position and the model position, thereby obtaining an acceleration correcting value based on the difference. This system then adjusts the model acceleration using the acceleration correcting value, thereby adjusting the amount of control.

As described above, in the first embodiment, a model head moves along an ideal position curve until it reaches a target position, and the actual head is controlled such that it follows up the ideal position curve and reaches the target position.

In the case of a head positioning system according to a second embodiment, which will be described in detail later, there is provided a switch for switching the followup relationship between the actual head and the model head. More specifically, to move the actual head to the target position, switching is performed such that the model head follows up the actual head in an acceleration zone (in which current saturation will occur), and that the actual head follows up the model head in a constant speed zone and a deceleration zone (in which current saturation will not occur). It is desirable that the switching operation is performed not instantly but gradually. The followup degree of the model head with respect to the actual head is gradually reduced from 100%, and the followup degree of the actual head with respect to the model head is gradually increased to 100%.

In the thus-constructed second embodiment, an unnecessary fine control during the acceleration zone is omitted, thereby realizing a more efficient seek operation.

The head positioning system of the present invention basically comprises the model speed control system and the actual speed control system. Further, the system of the present invention employs a method for theoretically removing variation factors during speed control processing, and controlling the head such that the actual head position follows up the model position calculated with high accuracy by the model speed control system. Thus, this method enables the speed control system to include the conventional transient control system. In other words, the conventional transient control processing can be omitted in the system of the present invention. Moreover, since the system of the present invention employs a model section with a function for estimating a a head position, the position of the head is corrected in a stable and accurate manner even if an actual machine section employed in the system fails to detect the actual position of the head.

The above structure can compensate for variations in control amount due to variations in head position or due to the influence of ambient disturbance, which may well occur in the conventional case. As a result, overshooting or undershooting of the head can be avoided. In addition, the system of the present invention can sufficiently deal with non-linear characteristics such as power level fluctuations, current saturation, etc. Application of the present invention, for example, to the HDD can provide a head positioning system capable of situating a head in a target position on a disk in a stable and accurate manner.

The embodiments of the present invention will be described in detail with reference to the accompanying drawings.

[First Embodiment]

Figure 2:
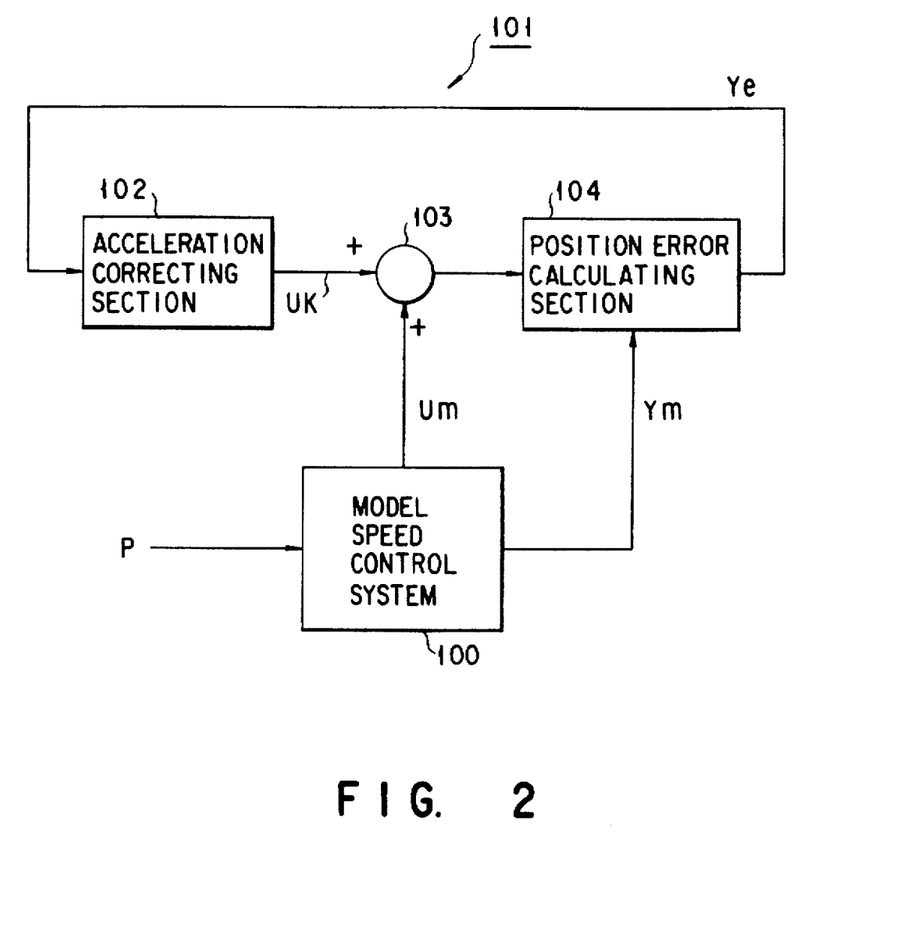
FIG. 2 is a block diagram, useful in explaining the principle of a speed control system incorporated in a head positioning system according to a first embodiment.
Figure 3A:
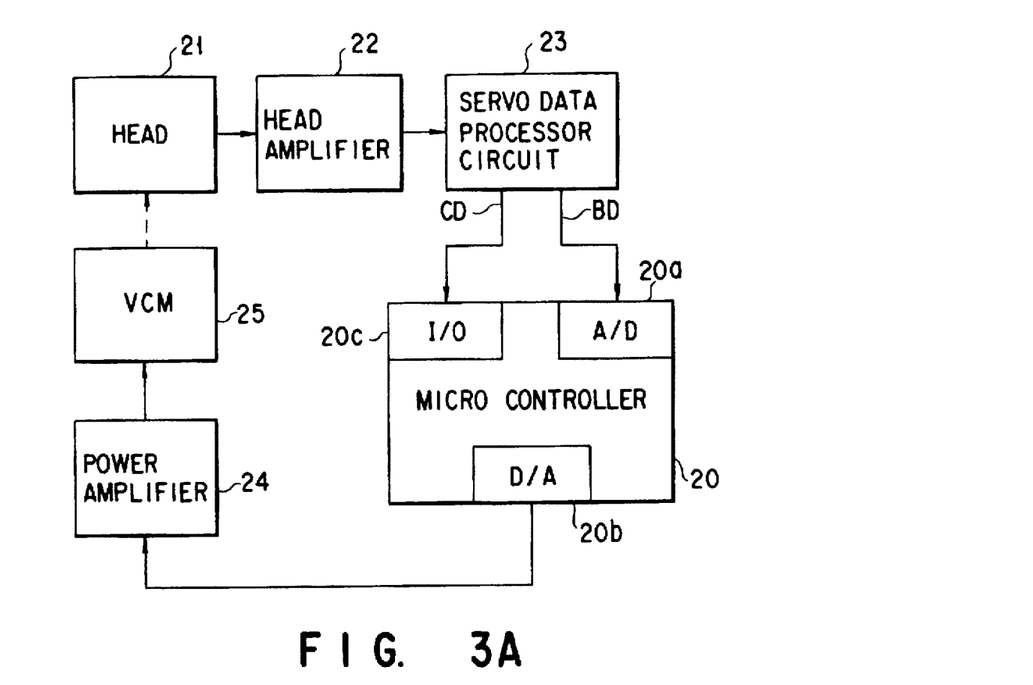
FIGS. 3A and 3B are block diagrams, useful in explaining the hardware structure of the head positioning system of the first embodiment incorporated in a hard disk drive (HDD)
Figure 3B:
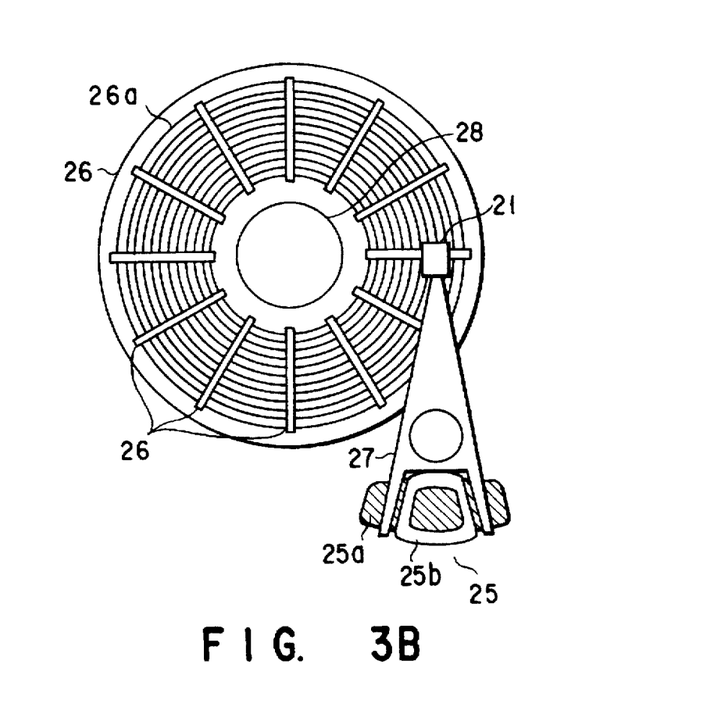
Figure 4:
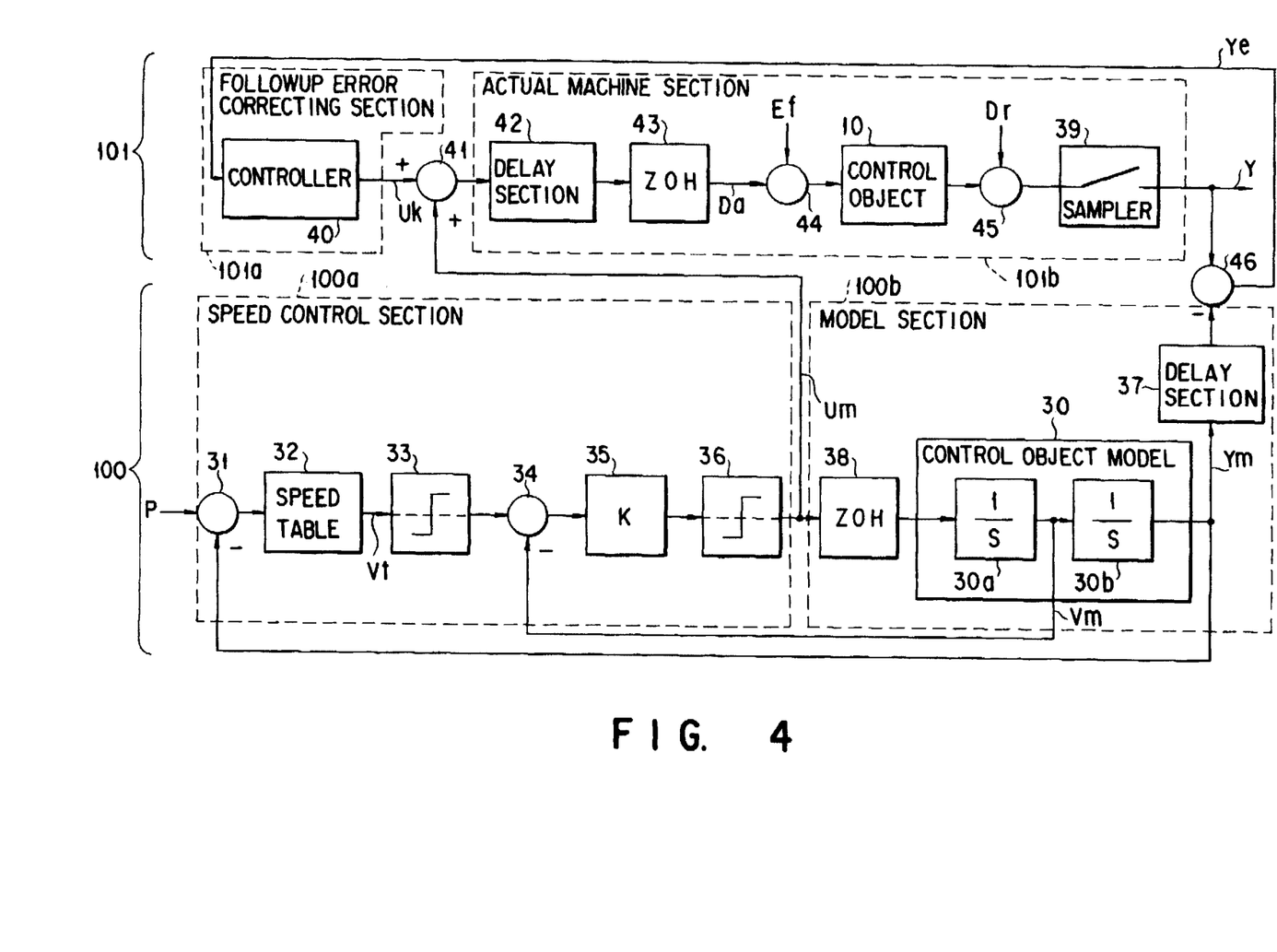
FIG. 4 is a block diagram, useful in explaining a speed control system incorporated in the first embodiment.
Figure 5A:
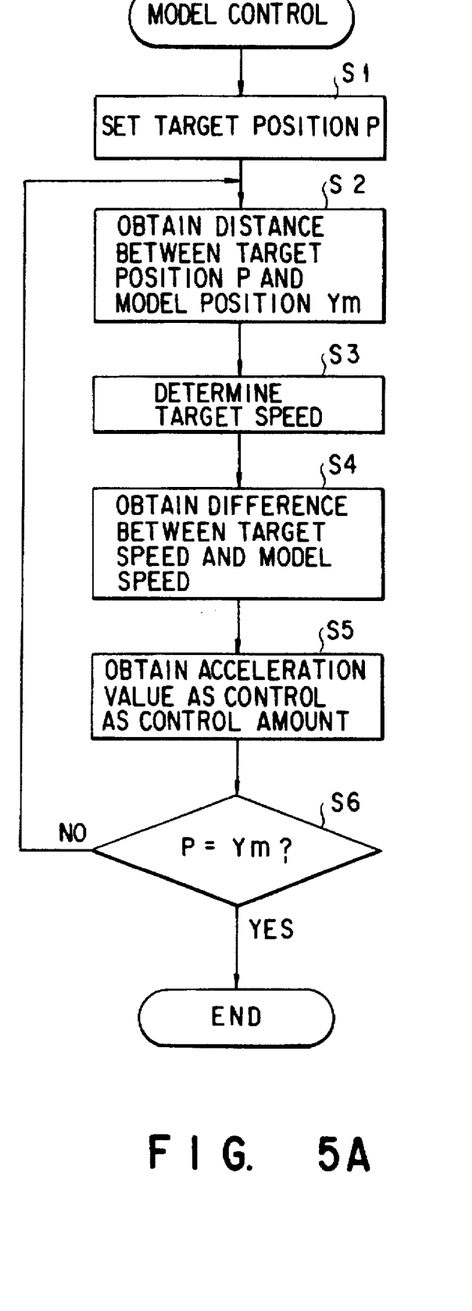
FIGS. 5A and 5B are flowcharts, useful in explaining the speed control system incorporated in the first embodiment.
Figure 5B:
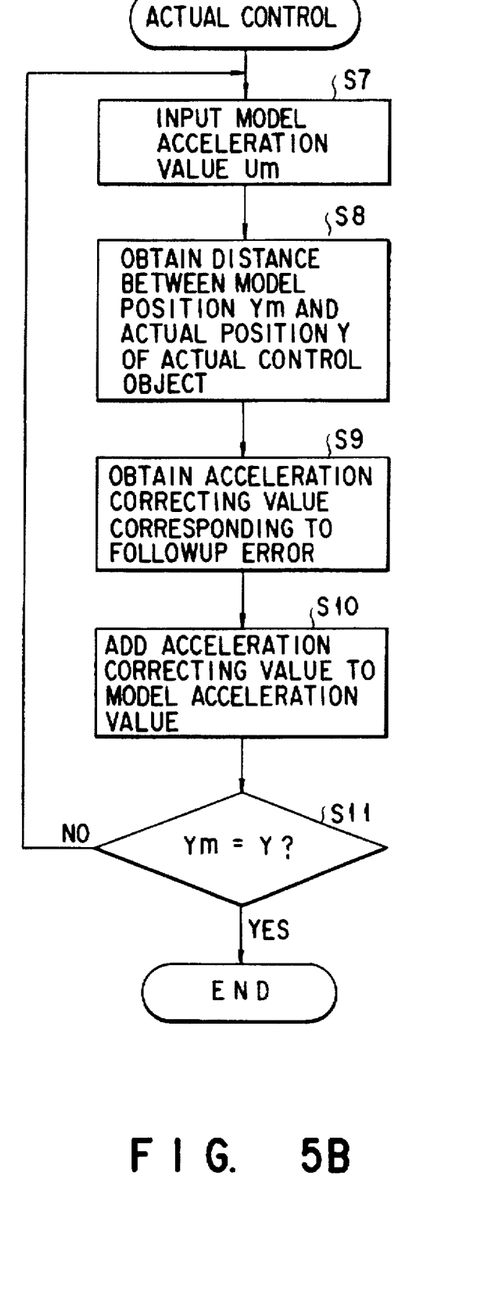

FIG. 2 is a block diagram, useful in explaining the principle of a speed control system incorporated in a head positioning system according to a first embodiment; FIGS. 3A and 3B are block diagrams, useful in explaining the hardware structure of the head positioning system of the first embodiment incorporated in an HDD; FIG. 4 is a block diagram, useful in explaining a speed control system incorporated in the first embodiment; and FIGS. 5A and 5B are flowcharts, useful in explaining the speed control system incorporated in the first embodiment.

(Structure of Speed Control System)

This embodiment employs a speed control system applicable to an HDD of a sector servo type and capable of moving a head, as an object to be controlled, to a position within a target track.

As is shown in FIG. 2, the speed control system of the embodiment mainly comprises a model speed control system 100 and an actual speed control system 101. The model speed control system 100 calculates model position data Ym indicative of the position of a moved model control object, when a target position P has been set. Furthermore, the system 100 calculates a target speed corresponding to the difference between the model position data Ym and the target position P, thereby obtaining model acceleration data Um from the target speed.

The actual speed control system 101 includes an element 103 for calculating the amount of control with reference to the model acceleration data Um; a position error calculating section 104 for calculating a position error Ye corresponding to the difference between the model position data Ym and position data Y indicative of the actual position of the control object (head) to be driven in accordance with the control amount; and an acceleration correcting section 102 for calculating an acceleration correcting value Uk corresponding to the position error Ye.

The element 103 for calculating the control amount adjusts the model acceleration data Um using the acceleration correcting value Uk, and consequently adjusts the control amount on the basis of the position error Ye. The amount of control for situating the actual control object in the target position P is calculated by the speed control system constructed as above, on the basis of the model position data Ym for causing the object to accurately follow up the target position P, and the model acceleration Um corresponding to the difference therebetween. Thus, the speed control system can compensate for variations in control amount which may be caused by ambient disturbance or variations in operational characteristics of the HDD mechanism (e.g. variations in rotational vibration of the disk).

(Structure of HDD)

As is shown in FIG. 3A, the system of the embodiment comprises a head positioning mechanism which includes, as a main component, a micro computer 20 installed in the HDD.

The CPU 20 consists of a micro processor having an A/D converter 20a, a D/A converter 20b and an I/O port 20c, and executes various operational processing (control processing) necessary for the speed control system of the embodiment (see FIG. 4).

As is shown in FIG. 3B, in the HDD, a plurality of heads 21 are held by a head actuator 27, and opposed to the opposite surfaces of a single disk 26, respectively. The head actuator 27 is a carriage which is rotated by the rotation of a voice coil motor (VCM) 25, thereby moving the heads 21 in a radial direction of the disk 26.

The VCM 25 comprises a magnet 25a and a driving coil 25b, and is driven by a driving current supplied from a power amplifier 24, which is a component of a VCM driver. The CPU 20 converts the calculated control amount to an analog signal (voltage signal) using the D/A converter 20b, and outputs the signal to the power amplifier 24. The power amplifier 24 converts the control amount from the CPU 20, to a driving current, and supplies the current to the VCM 25.

A single disk 26 or a plurality of disks 26 are provided, and rotated at high speed by a spindle motor 28. A plurality of concentric tracks 26a are formed on each disk 26, and a plurality of servo areas 26b are provided at regular intervals in each track 26a. Each servo area 26b stores the aforementioned servo data. A data sector for recording user data is provided between each pair of adjacent servo areas 26b.

The head 21 reads the servo data from the servo area 26b, and the user data from the data sector. A head amplifier 22 amplifies a read signal read by the head 21 and indicative of the servo data or the user data, and outputs the amplified signal to the data reproduction system.

In the HDD, the data reproduction system mainly includes a servo data reproduction system and a user data reproduction system. As is shown in FIG. 3A, in the embodiment, a servo data processing circuit 23 reproduces servo data from the read signal output from the head amplifier 22. The user data reproduction system converts the analog read signal to digital read data, thereby decoding the digital read data into a recorded data (e.g. NRZ-encoded data) string and transmitting the decoded data to a disk controller (HDC).

The servo data processing circuit 23 extracts servo data from the read signal and output it to the CPU 20. As described above, the servo data mainly includes a cylinder code (or a track address) CD and burst data BD.

The burst data BD is used for position control for positioning the head 21 at the center of a target track. The cylinder code CD is used for the speed control of the present invention, and used to detect a track on which the head is presently situated.

The CPU 20 receives the cylinder code CD via the I/O port 20c, and uses it for the speed control processing. On the other hand, the CPU 20 receives the burst data BD after it is converted into digital data by the A/D converter 20a, and uses it for the position control.

The servo data processing circuit 23 has a function for creating a sector pulse (a servo sector pulse for each servo area 26b) for determining a sampling interval necessary to perform the speed control processing of the embodiment.
(Speed Control System of the Embodiment)

The speed control system of the embodiment has a structure as shown in FIG. 2, and is applied to a head positioning system which has, as a main component, the CPU 20 shown in FIG. 3A.

As is shown in FIG. 4, the speed control system of the embodiment mainly includes the model speed control system 100 and the actual speed control system 101, which are actually implemented by control processing performed by the CPU 20. The model speed control system 100 has a speed control section 100a and a model section 100b, which include various structural elements. The actual speed control system 101 has a followup error correcting section 101a and an actual machine section 101b, which include various structural elements.

The model speed control system 100 also has a control object model 30 corresponding to the actual control object 10. The control object model 30 consists of double integral elements 30a and 30b for creating model speed data (indicative of a reference speed curve) Vm and model position data (indicative of a reference position curve) Ym, respectively.

Moreover, the model speed control system 100 has a difference element 31 for calculating the difference between the target position P and the model position data Ym (=a distance corresponding to the number of tracks existing between these positions), and a difference element 34 for calculating the difference between target speed data (indicative of a target speed curve) Vt and the model speed data Vm.

Figure 8:
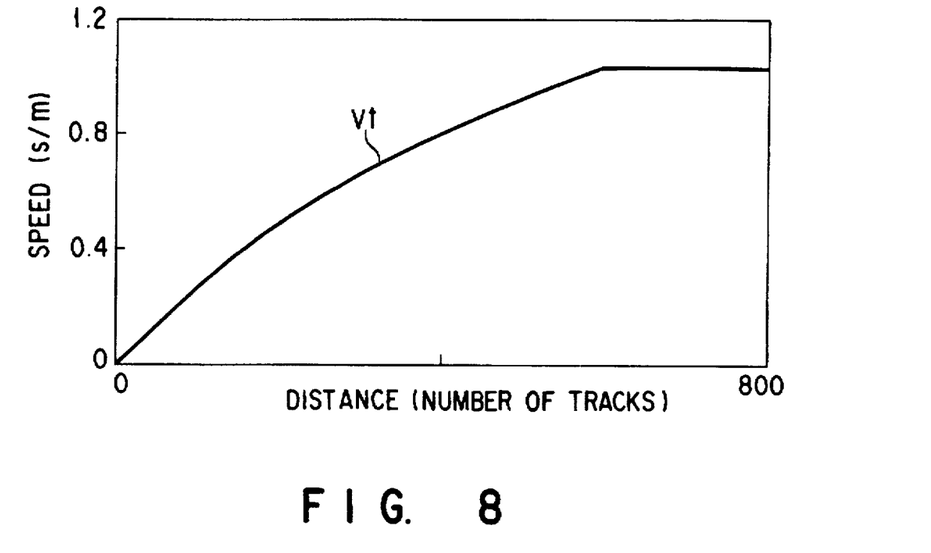
FIG. 8 is a third graph, useful in explaining the operation of the speed control system incorporated in the first embodiment.

A speed table 32 stores data for determining the target speed curve Vt corresponding to the difference obtained by the difference element 31 (see FIG. 8). A limiter 33 sets the upper limit of a target speed value obtained by the speed table 32.

A compensation element 35 and a limiter 36 create model acceleration data (indicative of a reference speed curve) Um corresponding to the difference obtained by the difference element 34. The compensation element 35 multiplies the speed error obtained from the difference element 34 by a constant gain K. The model acceleration data Um is supplied to the actual speed control system 101, and also to a zero-order hold (sampling hold) element 38 located previous to the control object model 30. The model position data Ym is supplied to the actual speed control system 101 via a delay element 37.

The delay element 37 corresponds to a delay element 42 representing various operational delays and incorporated in the actual speed control system 101. In other words, the model speed control system 100 is provided for causing the actual position curve (indicated by the actual position data Y) to approach the model position curve (indicated by the model position data Ym) by supplying the acceleration data Um (indicative of the model acceleration curve) to both the control object model 30 and the actual control object 10.

If there is no positional difference between the control object model 30 and the actual control object 10 at a certain point of time, no difference will occur from the time between the model position curve and the actual position curve by simultaneously supplying the same acceleration data to them. Actually, however, in the actual speed control system 101, the acceleration data Um is a little later input to the actual control object 10 because of the delay element 42 corresponding to various operational delays. Accordingly, the resultant actual position curve Y will be displaced from the model position curve Ym by the input delay.

If the operations take no time, no problem will occur. This is actually impossible, however. Instead of removing the operational delays, the delay element 37 is imparted to the model control system so as to minimize the positional difference.

The actual speed control system 101 samples, at regular sampling intervals using a sampler 39, the actual position data Y from the control object 10, and thereby supplying to an acceleration correcting element (hereinafter referred to "controller") 40 the position error Ye corresponding to the difference between the model position data Ym and the actual position data Y, which is calculated by a difference element 46.

The controller 40 is a kind of a compensating element for calculating an acceleration correcting value Uk corresponding to the position error Ye. An adder element 41 adds the acceleration correcting value Uk, as a correction value, to the model acceleration data Um.

The adder element 41, the delay element 42 and the zero-order hold (sample hold) element 43 cooperate to calculate a control amount Da for controlling the actual control object 10. The head 21 as the actual control object 10 is controlled on the basis of the control amount Da so that the position error Ye between the actual position data Y and the model position data Ym can approach 0.

The disturbance force Ef such as a force created at the time of collision is added to the control amount Da by an adder element 44. Further, a variation in position of the actual control object 10 due to the operational characteristics of the HDD mechanism (e.g. the rotational vibration Dr of the disk) is added to the position data of the actual control object 10 by an adder element 45.

(Operation of the Speed Control System of the Embodiment)

When the target position P (i.e. the target track to be accessed) is determined, the speed control system of the present invention executes speed control so that the head 21 can follow up the target speed curve Vt (see FIG. 8) corresponding to the distance between the present position (indicated by the position data Y) of the head 21 and the target position P. In this embodiment, the speed control is executed by calculating the position error Ye on the basis of the model position data Ym from the model speed control system 100, and adjusting the model acceleration data Um on the basis of the position error Ye to obtain the control amount Da.

The operation of the first embodiment will be described with reference to the flowcharts illustrated in FIGS. 5A and 5B.

When the target position P is determined, the model speed control system 100 calculates the distance between the target position P and the model position Ym, using the difference element 31 (steps S1, S2). In other words, the CPU 20 controls the model speed control system 100 so as to execute model speed control processing for moving the control object model 30 to the target position P.

The target speed curve Vt is obtained from the distance between the target position P and the model position Ym, using the speed table 32 (step S3). As is indicated by the target speed curve of FIG. 8, the control object (head) is accelerated in an initial stage and decelerated as it approaches the target position.

Figure 6:
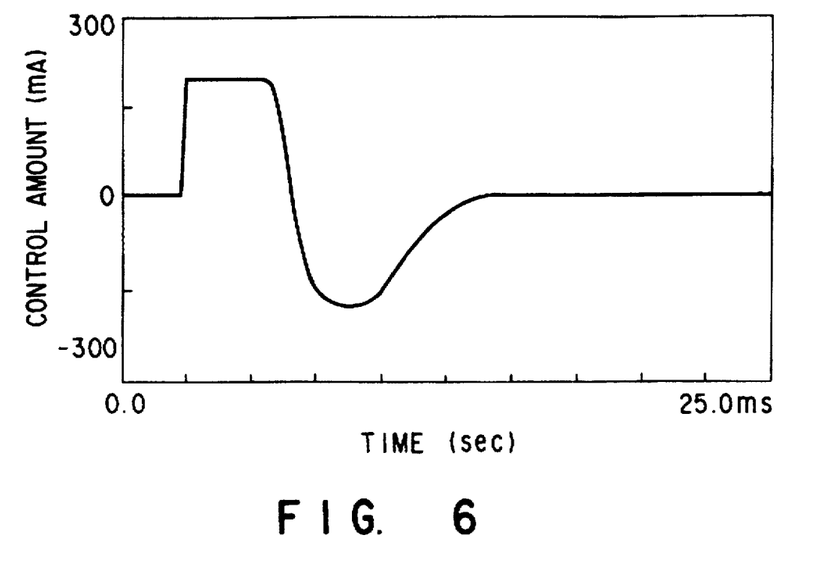
FIG. 6 is a first graph, useful in explaining the operation of the speed control system incorporated in the first embodiment.

The difference between the model speed Vm and a corresponding speed on the target speed curve Vt is calculated, using the difference element 34, to obtain the control amount as the model acceleration value Um (steps S4, S5). The control amount shows characteristics as shown in FIG. 6. In FIG. 6, the abscissa indicates a time period T required from the start to the end of the movement of the control object model 30, while the ordinate indicates the amount of control expressed by the amount of driving current.

Figure 7:
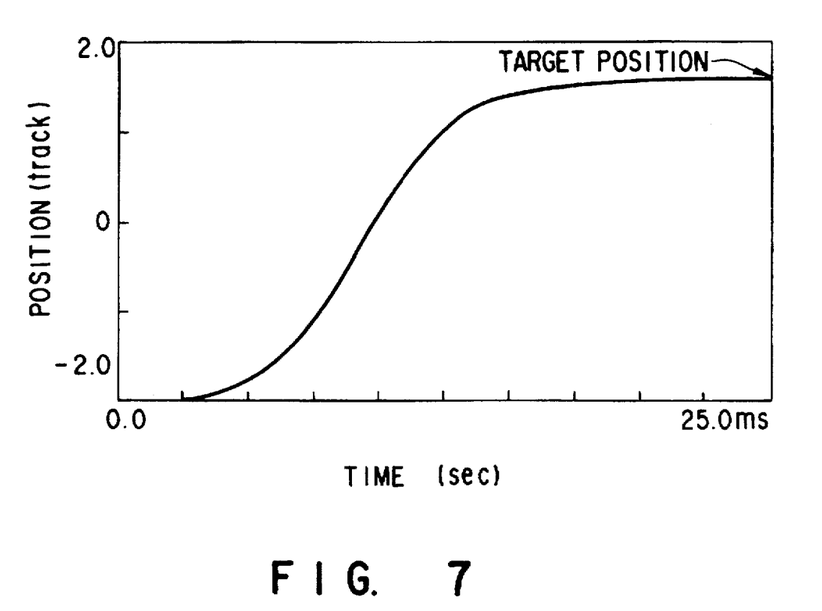
FIG. 7 is a second graph, useful in explaining the operation of the speed control system incorporated in the first embodiment.

In the model speed control system 100, the above-described calculations are repeated each time the position of the control object model 30 is sampled, thereby situating the control object model 30 in the target position P (step S6). FIG. 7 shows the model position curve Ym.

In the above-described calculations, the model acceleration data Um corresponding to the control amount of the model speed control system 100 is obtained each time the model 30 is sampled.

The state of the model speed control system 100 is given by the following equations (1) and (2):

$$Vm(T+1)=Vm(T)+Um(T)\times Td \quad (1)$$

$$Ym(T+1)=Ym(T)+(Vm(T+1)+Vm(T))\times (Td/2) \quad (2)$$

where Vm (T) represents a model speed at a time point T, Vm (T+1) a model speed at a time point (T+1), Ym (T) a model position at the time point T, Ym (T+1) a model position at the time point (T+1), Um (T) a model acceleration at the time point T, and Td a sampling time point.

On the other hand, the actual speed control system 101 receives the model acceleration data Um from the model speed control system 100 via the adder element 41 at regular sampling intervals (step S7). The actual control object (i.e. the head 21) is moved on the basis of the control amount Da, which is calculated based on the model acceleration data Um.

In other words, the CPU 20 calculates the control amount Da on the basis of the model acceleration data Um obtained by the model speed control system 100, and controls the head 21 by converting the control amount into the driving current for the VCM 25 via the D/A converter 20b and the power amplifier 24.

As described above, the actual control object 10 moves along the position curve Y which differs from the model position curve Ym, since it is influenced by the aforementioned disturbance force Ef or the operational characteristics of the HDD mechanism (e.g. the rotational vibration Dr of the disk).

The difference element 46 calculates the position error Ye of the actual position curve Y relative to the model position curve Ym (step S8). The controller 40 calculates the acceleration correcting value Uk corresponding to the position error Ye (step S9). The adder element 41 adds the acceleration correcting value Uk, as the correcting value, to the model acceleration data Um (step S10). As a result, the control amount Da is adjusted on the basis of the position error Ye, which means that the actual control object 10 is controlled so as to follow up the model position curve Ym.

Figure 9:
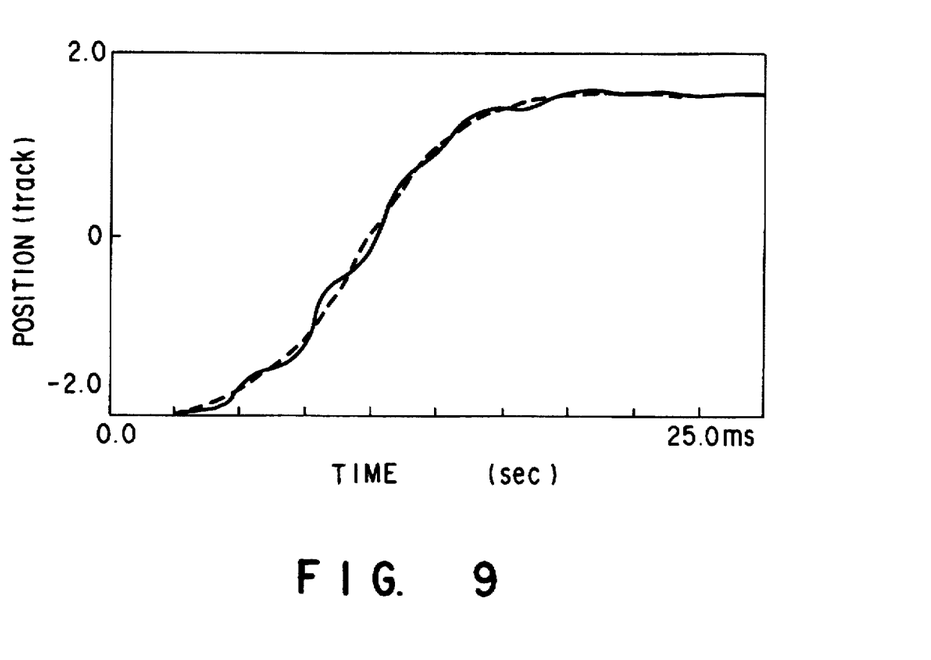
FIG. 9 is a fourth graph, useful in explaining the operation of the speed control system incorporated in the first embodiment.

In other words, correcting the control amount Da in accordance with the position error Ye at regular sampling intervals causes the actual position curve Y of the actual control object 10 to follow up the model position curve Ym (step S11). The solid line and the broken line in FIG. 9 indicate the actual position curve Y and the model position curve Ym, respectively.

As described above, when the target position P, i.e. the target track to be accessed, is determined, the model speed control system 100 executes speed control processing to make the model position Y approach the target position P. To this end, speed control processing is performed so as to make the control object model 30 follow up the target speed curve Vt, thereby creating, at regular sampling intervals, the model position data Ym, the model speed data Vm and the model acceleration data Um corresponding to the model control amount.

The model speed control system 100 performs a kind of simulation based on theoretical formulas, thereby obtaining the accurate model position curve Ym for situating the model 30 in the target position P, and the model acceleration Um (corresponding to the model control amount) for realizing the model position curve Ym.

On the other hand, the actual speed control system 101 for moving the actual control object 10 (i.e. the head 21) calculates the control amount Da on the basis of the model acceleration data Um output from the model speed control system 100 at regular sampling intervals.

Since the position of the actual control object 10 is varied by the disturbance force Ef or the rotational vibration Dr of the disk, the object follows up the actual position curve Y which is displaced from the model position curve Ym. Calculating an acceleration correcting value for compensating for the position error Ye between the model position curve Ym and the actual position curve Y can adjust the control amount Da to an optimal value. Thus, the actual control object 10 can be situated in the target position P by making the actual position curve Y approach the model position curve Ym.

The model position curve Ym, which the actual control object 10 should follow up, is set accurately with respect to the target position P, since it is obtained by the model speed control system 100 on the basis of preset theoretical formulas. The actual speed control system 101 executes speed control so as to cause the actual position curve Y of the actual control object 10 to follow up the accurate model position curve Ym, with the result that the object 10 can accurately be situated in the target position P. As described above, the actual position curve Y of the object 10 is substantially influenced by variation factors such as the disturbance force Ef, the rotational vibration Dr of the disk, etc. This means that the actual speed control system 101 compensates for such variation factors in its speed control processing.

In the conventional speed control system, variations in position and/or speed of the control object are compensated in the transient control system. However, as described above, it is possible that variations in speed will not be compensated at the time of shifting to the transient control, and hence that the overshooting or undershooting of the control object will occur. On the other hand, in the speed control system of the first embodiment, control processing to compensate variations in position and/or speed of the control object is executed, and accordingly the control object can accurately be situated in the target position or near the same although control processing corresponding to the conventional transient control is not executed in the embodiment.

[Second Embodiment]

A second embodiment of the present invention will now be described. In this embodiment, elements similar to those in the first embodiment are denoted by corresponding reference numerals, and not described in detail.

Figure 10:
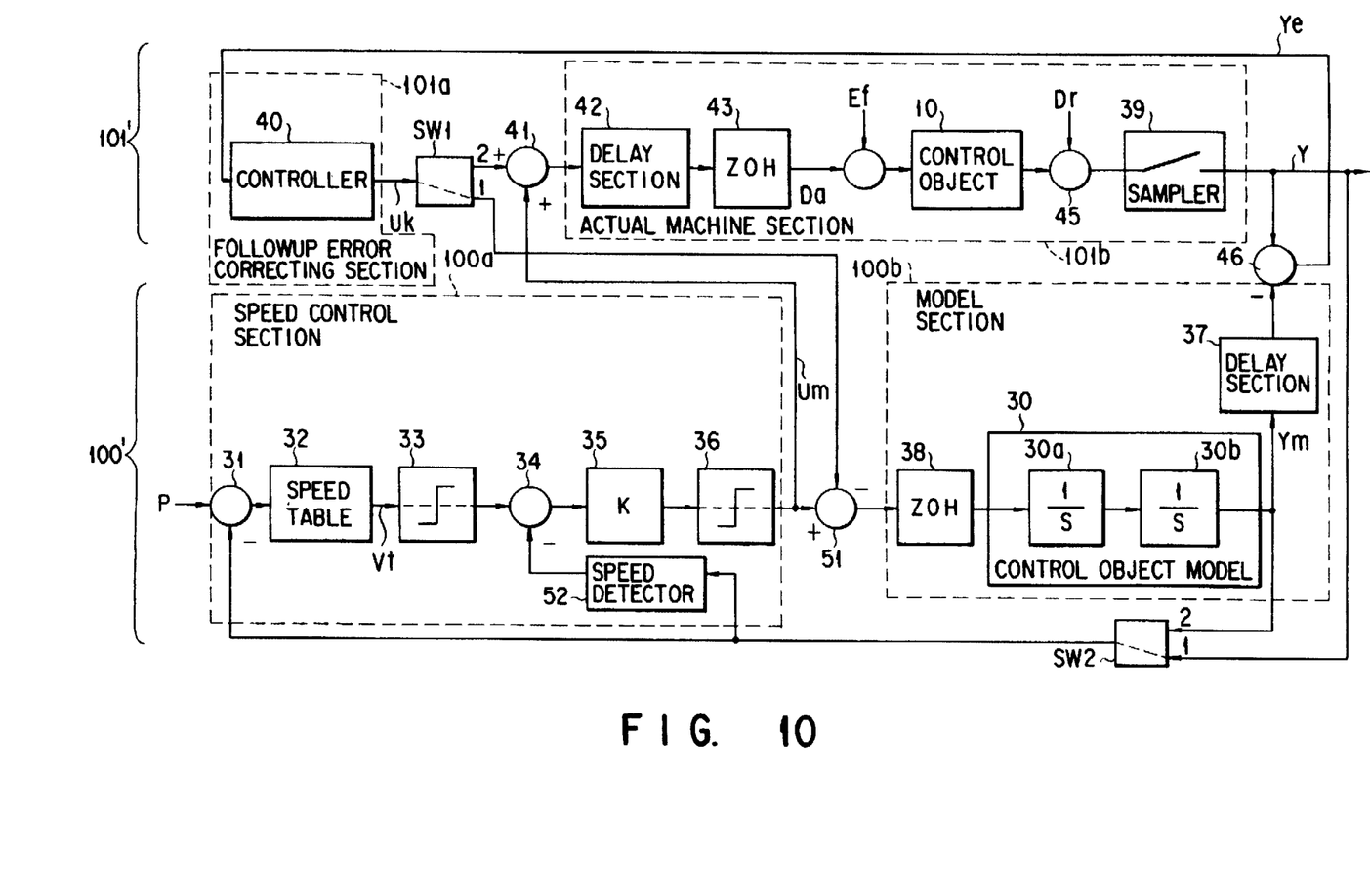
FIG. 10 is a block diagram, useful in explaining the principle of a speed control system incorporated in a head positioning system according to a second embodiment.

FIG. 10 is a block diagram, useful in explaining the principle of a speed control system incorporated in a head positioning system according to the second embodiment. The second embodiment differs from the first embodiment in that in the former, the followup relationship between the actual control object (head) and a model control object is changeable.

As is shown in FIG. 10, a switch SW1 is provided for supplying one of the adder element 41 and the adder element 51 with the correction value Uk output from the followup error correcting section 101a. Further, a switch SW2 is provided for supplying a speed control section 100a'with one of the model position data (reference position curve) Ym output from the model section 100b, and the actual position data (actual position curve) Y output from the actual machine section 101b.

In the first embodiment (FIG. 4), the model speed data (reference speed curve) Vm concerning the control object model 30 and obtained in the middle of calculations is supplied directly to the difference element 34. In the second embodiment, however, the difference element 34 receives the model position data (reference position curve) Ym or speed data obtained by a speed detector 52 on the basis of the actual position curve Y.

In the above-described system, to move the actual head to the target position, the switches SW1 and SW2 perform switching such that the model head follows up the actual head in an acceleration zone (in which current saturation will occur), and that the actual head follows up the model head in a constant speed zone and a deceleration zone (in which current saturation will not occur).

More specifically, in the acceleration zone, the switches SW1 and SW2 are connected to contacts 1, respectively, so as to make the model head follow up the actual head. On the other hand, in the constant speed zone and the deceleration zone, the switches SW1 and SW2 are connected to contacts 2, respectively, so as to make the actual head follow up the model head.

The switching control of the switches SW1 and SW2 is performed by the micro computer 20, etc., as explained with respect to FIG. 3A.

Desirably, the switching operation is performed not instantly but gradually. The followup degree of the model head with respect to the actual head is gradually reduced from 100%, and the followup degree of the actual head with respect to the model head is gradually increased to 100%.

Figure 11:
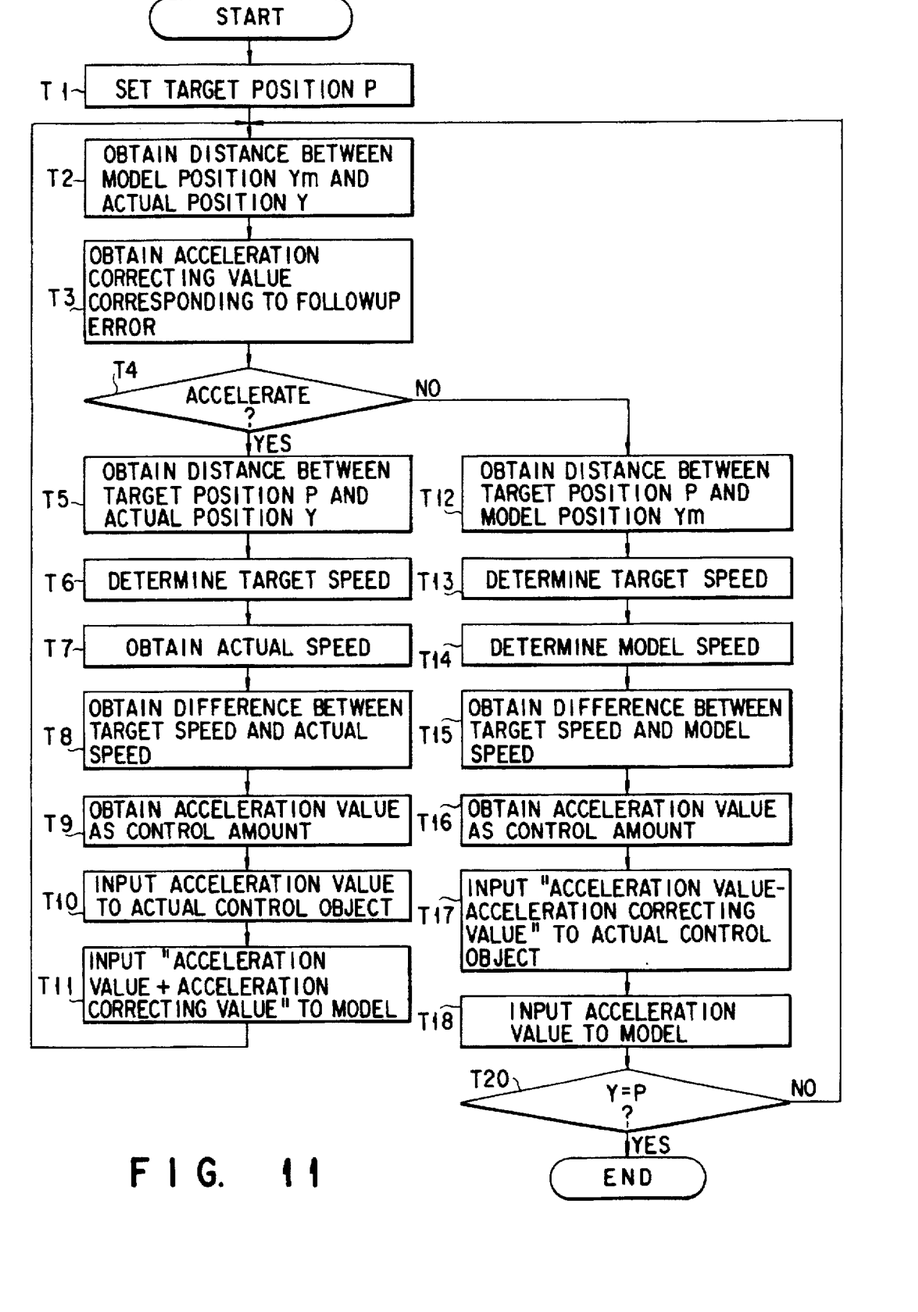
FIG. 11 is a flowchart, useful in explaining the speed control system incorporated in the second embodiment.

The operation of the second embodiment will be described with reference to the flowcharts illustrated in FIG. 11.

First, the target position P is determined (step T1). On the other hand, the difference element 46 calculates the position error Ye between the model position curve Ym and the actual position curve Y (step T2). The controller 40 calculates the acceleration correcting value Uk corresponding to the position error Ye (step T3). It is determined whether or not the acceleration is executed. If yes, the step T5 is carried out. If no, the step T12 is carried out.

When the acceleration is executed, the switches SW1 and SW2 are connected to contacts 1, respectively. the distance between the target position P and the actual position Y is calculated by the difference element 31 (step T5). In other words, the CPU controls the model speed control system 100' so as to execute the speed control processing for moving the control object 10 to the target position P. Using the speed table 32, the target speed curve Vt is obtained from the distance between the target position P and the actual position Y (step T6). The actual speed of the control object 10 is obtained by the speed detector 52 (step T7). Further, the difference between the target speed Vt and the actual speed is calculated, using the difference element 34, to obtain the control amount as the actual acceleration value Um (steps T8, T9). The obtained actual acceleration value Um is supplied to the control object 10 through the adder element 41 (step T10). Also, the obtained actual acceleration value Um added with the acceleration correcting value Uk is supplied to the control object model 30 through the adder element 51 (step T11). Thereafter, the processes are carried out from the step T2. During the acceleration process described above, the system is in the state that the model follows up the actual machine.

On the other hand, when the deceleration is executed, the switches SW1 and SW2 are connected to contacts 2, respectively. In the step T4, if no, the distance between the target position P and the model position Ym is calculated by the difference element 31 (step T12). In other words, the CPU controls the model speed control system 100' so as to execute the speed control processing for moving the control object model 30 to the target position P. Using the speed table 32, the target speed curve Vt is obtained from the distance between the target position P and the model position Ym (step T13). The model speed of the control object model 30 is obtained by the speed detector 52 (step T14). Further, the difference between the target speed Vt and the model speed is calculated, using the difference element 34, to obtain the control amount as the model acceleration value Um (steps T15, T16). The obtained model acceleration value Um reduced by the acceleration correcting value Uk is supplied to the control object 10 through the adder element 41 (step T17). Also, the obtained model acceleration value Um is supplied to the control object model 30 through the adder element 51 (step T18). Thereafter, the processes are repeated from the step T2. During the deceleration process described above, the system is in the state that actual machine follows up the model.

Next, it is determined whether or not the actual position Y of the control object 10 coincides with the target position P. If no, the processes are carried out from the step T2. If yes, the process of the system is terminated.

The second embodiment constructed as above can provide the same advantage as the first embodiment. In addition, since the second embodiment need not perform fine control in the acceleration zone, it can realize a more efficient seek operation.

As described above in detail, the head positioning system of the present invention basically comprises the model speed control system and the actual speed control system. The system of the present invention employs a control method for compensating for variation factors in the speed control processing so as to make the actual head position follow up a model position calculated by the model speed control system with accuracy. By virtue of this method, the function of the conventional transient control system is covered by the speed control system of the present invention. In other words, the head positioning processing executed in the present invention does not require the conventional transient control processing. Moreover, even if in the present invention, the actual machine section misunderstands the head position, the model section estimates a correct head position. As a result, the head can be situated in a correct position in a stable and accurate manner.

The above structure can compensate variations in control amount due to variations in head position or due to the influence of ambient disturbance, which may well occur in the conventional case. Accordingly, overshooting or undershooting of the head can be avoided. In addition, the system of the present invention can sufficiently deal with non-linear characteristics such as power level fluctuations, current saturation, etc. Application of the present invention, for example, to the HDD can provide a head positioning system capable of situating a head in a target position on a disk in a stable and accurate manner.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A head positioning control system for controlling to move a head to a target position on a disk as a recording medium on the basis of servo data recorded on the disk in a disk drive, the system comprising:

model control means for modeling movement control for moving the head to the target position, thereby calculating a model position of the head;

actual control means for performing movement control for moving the head to the target position, thereby calculating the actual position of the head;

means for calculating a model acceleration for the head on the basis of the distance between the target position and the model position, the model acceleration being used in the model control means and the actual control means; and means for calculating a correcting value for correcting the model acceleration, on the basis of a displacement of the actual position from the model position, the correcting value being added to the model acceleration used in the actual control means.

2. The system according to claim 1, wherein the model acceleration calculation means includes:

a target speed table used for calculating a target speed on the basis of the distance between the target position and the model position;

means for extracting a model speed from the model control means; and means for calculating the model acceleration on the basis of the difference between the target speed and the model speed.

3. The system according to claim 1, wherein the model control means includes a double integral element for calculating the model speed and the model position on the basis of the model acceleration.

4. The system according to claim 1, wherein the actual control means includes:

means for extracting the servo data read by the head; and means for calculating the actual position on the basis of the extracted servo data.

5. The system according to claim 1, wherein the actual control means includes a sampler for sampling the obtained actual position at regular intervals.

6. A head positioning control system for controlling to move a head to a target position on a disk as a recording medium on the basis of servo data recorded on the disk in a disk drive, the system comprising:

model control means for modeling movement control for moving the head to the target position, thereby calculating a model position of the head;

actual control means for performing movement control for moving the head to the target position, thereby calculating the actual position of the head;

means for calculating a model acceleration for the head on the basis of one of the distance between the target position and the actual position, and the distance between the target position and the model position, the model acceleration being used in the model control means and the actual control means;

means for calculating a correcting value for correcting the model acceleration, on the basis of a displacement of the actual position from the model position, the correcting value being added to one of the model acceleration used in the model control means, and the model acceleration used in the actual control means; and switch means, wherein when the head is in an acceleration zone, the switch means causes the actual position calculated by the actual control means to be supplied to the model acceleration calculating means, and causes the correcting value calculated by the correcting value calculation means to be supplied to the model control means, and when the head is in a deceleration zone, the switch means causes the model position calculated by the model control means to be supplied to the model acceleration calculating means, and causes the correcting value calculated by the correcting value calculation means to be supplied to the actual control means.

7. The system according to claim 6, wherein the model acceleration calculation means includes:

a target speed table used for calculating a target speed on the basis of one of the distance between the target position and the actual position, and the distance between the target position and the model position;

means for extracting a model speed from the model control means; and means for calculating the model acceleration on the basis of the difference between the target speed and the model speed.

8. The system according to claim 6, wherein the model control means includes a double integral element for calculating the model speed and the model position on the basis of the model acceleration.

9. The system according to claim 6, wherein the actual control means includes:

means for extracting the servo data read by the head; and means for calculating the actual position on the basis of the extracted servo data.

10. The system according to claim 6, wherein the actual control means includes a sampler for sampling the obtained actual position at regular intervals.

11. A head positioning control method of controlling to move a head to a target position on a disk as a recording medium on the basis of servo data recorded on the disk in a disk drive, the method comprising the steps of:

modeling movement control for moving the head to the target position, and calculating a model position of the head;

performing movement control for moving the head to the target position, thereby calculating the actual position of the head;

calculating a model acceleration for the head on the basis of the distance between the target position and the model position;

using the model acceleration in the model control steps and in the actual control step;

calculating a correcting value for correcting the model acceleration, on the basis of a displacement of the actual position from the model position; and adding the correcting value to the model acceleration used in the actual control step.

12. The method according to claim 11, wherein the model acceleration calculation step includes the steps of:

calculating a target speed on the basis of the distance between the target position and the model position;

extracting a model speed from the model control step; and calculating the model acceleration on the basis of the difference between the target speed and the model speed.

13. The method according to claim 11, wherein the model position calculation step includes the step of calculating the model speed and the model position on the basis of the model acceleration, using double integral.

14. The method according to claim 11, wherein the actual position calculation step includes the steps of:

extracting the servo data read by the head; and calculating the actual position on the basis of the extracted servo data.

15. The method according to claim 11, wherein the actual position calculation step includes the step of sampling the obtained actual position at regular intervals.

16. A head positioning control method of controlling to move a head to a target position on a disk as a recording medium on the basis of servo data recorded on the disk in a disk drive, the method comprising the steps of:

modeling movement control for moving the head to the target position, thereby calculating a model position of the head;

performing movement control for moving the head to the target position, thereby calculating the actual position of the head;

calculating a model acceleration for the head on the basis of one of the distance between the target position and the actual position, and the distance between the target position and the model position;

using the model acceleration in the model position calculation step and in the actual position calculation step;

calculating a correcting value for correcting the model acceleration, on the basis of a displacement of the actual position from the model position;

adding the correcting value to one of the model acceleration used in the model position calculation step, and the model acceleration used in the actual position calculation step;

causing the actual position calculated in the actual position calculation step to be used in the model acceleration calculating step, and causing the correcting value calculated in the correcting value calculation step to be used in the model position calculation step, when the head is in an acceleration zone; and causing the model position calculated in the model position calculation step to be used in the model acceleration calculating step, and causing the correcting value calculated in the correcting value calculation step to be used in the actual position calculation step, when the head is in a deceleration zone.

17. The method according to claim 16, wherein the model acceleration calculation step includes the steps of:

calculating a target speed on the basis of one of the distance between the target position and the model position, and the distance between the target position and the actual position;

extracting a model speed from the model position calculation step; and calculating the model acceleration on the basis of the difference between the target speed and the model speed.

18. The method according to claim 16, wherein the model position calculation step includes the step of calculating the model speed and the model position on the basis of the model acceleration, using double integral.

19. The method according to claim 16, wherein the actual position calculation step includes the steps of:

extracting the servo data read by the head; and calculating the actual position on the basis of the extracted servo data.

20. The method according to claim 16, wherein the actual position calculation step includes the step of sampling the obtained actual position at regular intervals.

* * * * *